United States Patent Office 3,028,774
Patented Apr. 10, 1962

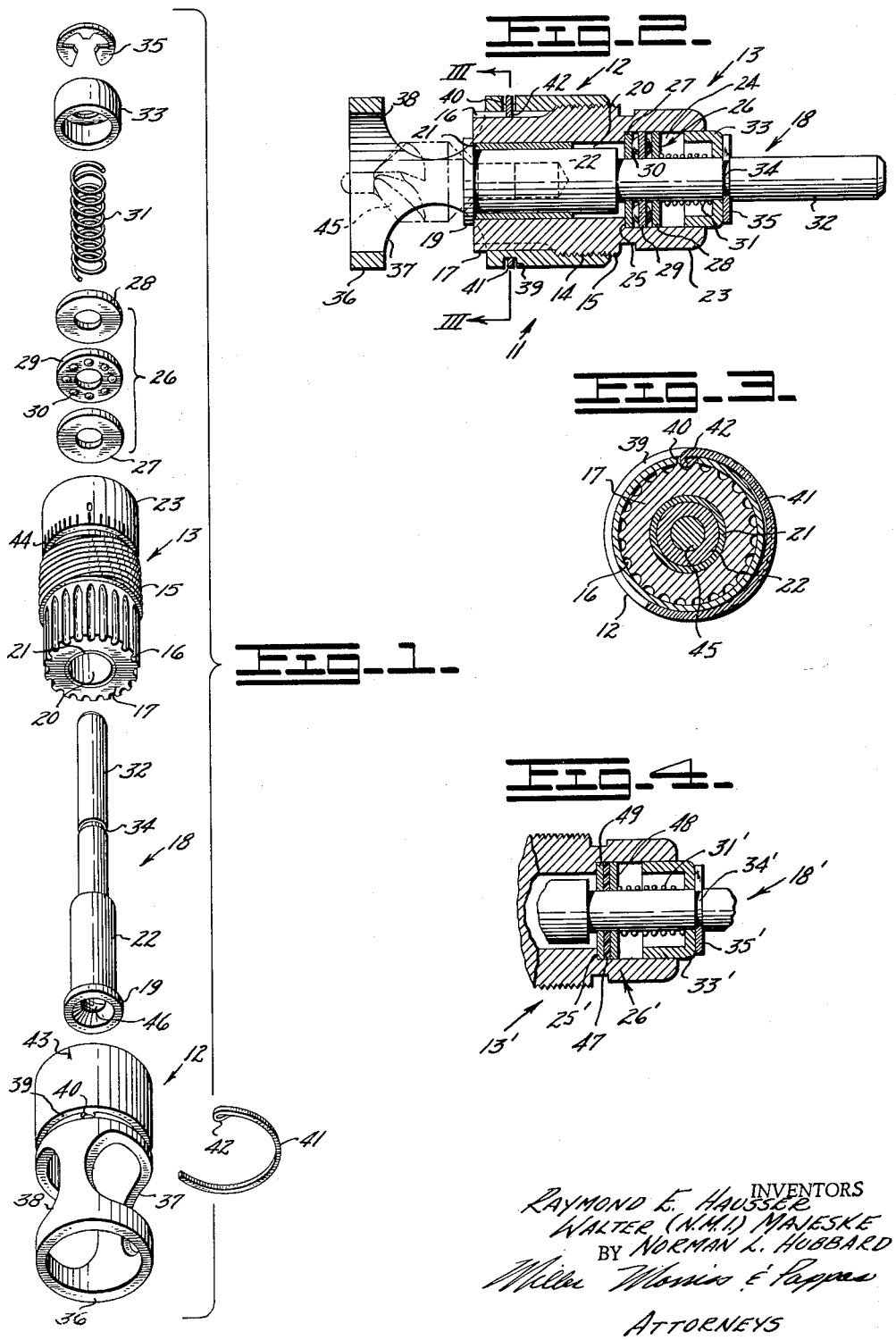

3,028,774
STOP-COUNTERSINK TOOL
Raymond E. Hausser, Walter Majeske, and Norman L. Hubbard, Saginaw, Mich., assignors to Severance Tool Industries, Inc., Saginaw, Mich., a corporation of Michigan
Filed Feb. 8, 1960, Ser. No. 7,259
6 Claims. (Cl. 77—73.5)

The present invention relates to a new and improved stop tool and more particularly to a micrometer adjustment stop countersink tool provided with a click type feeler adjustment operative from the exterior of the structure.

Stop countersink tools are employed in precision countersinking of holes were repetitive accuracy is required and where the countersink area must be substantially free from burrs. The stop countersink tool must be adjustable to provide a substantial variance in depth below a reference plane which is usually the work surface. The stop countersink must preferably be provided with radial and thrust bearings which carry the rotation of the countersink holding spindle and the thrust developed in the reciprocating stroke. While countersinking is the major tool use with such structures, it will be appreciated that such devices may also be used with drills, reamers and other such tools.

The patent art fairly well traces the development of such countersink tools commencing, for example with United States Letters Patent 1,389,390 wherein a fixed stop or gage element was employed and reaching a current point of refinement in United States Letters Patent 2,905,030 wherein combinations of needle bearings and ball thrust bearings are combined with adjustability of depth of stroke. Intermediate these two devices are a long line of refinements. At least as early as 1940, as expressed in United States Letters Patent 2,192,528 the problem of adjustment of tool end depth was treated along with control of spindle precision and reduction of friction in the stop unit. The development of the art generally paralleled the progress in the aircraft industry where control of countersinking was considered vital in providing air and fluid tight rivet seats over wide expanses of fuselage and wing surfaces. As is so frequently observed in the development of an art the devices generally become more and more structurally complex and necessarily expensive to produce.

The present device seeks to provide a structure of great simplification as a result of new and novel incorporation of accurate adjustment control whereby the adjusting means is external of the major portion of the structure thereby providing greater internal areas for spindle control unfettered by housed ratchet or click control structures and wherein the entire device is amenable to rapid disassembly for field service, repair, or replacement of the several simple elements comprising the entire device.

As a consequence, one of the objects of the present invention is to provide a depth adjustment combination wherein the bias therefor is external of the stop tool bearing housing.

Another object is the provision of a vastly simplified stop countersink tool.

Another object is to provide a stop countersink tool wherein any wear on the unique adjustment does not result in fouling of adjacent precision vital bearings or bearing surfaces and the introduction of a simplified form of bearing engagement.

Still another object is the provision of a simplified stop countersink structure which is easily disassembled without unusual skills or tools.

Other objects including overall lower cost, simple amenability to field repair and service without sacrifice of precision operation and depth control will be increasingly apparent to those skilled in the countersinking art as the description proceeds.

In the drawings:

FIGURE 1 is an exploded perspective view of the several elements as they are grouped for assembly of the presently described stop countersink tool.

FIGURE 2 is a full section view taken along the axis of an assembled stop countersink tool and indicating the attachment of a countersink in phantom line.

FIGURE 3 is a section view transversely through the axis of the tool as illustrated in FIGURE 2 and taken on the line III—III.

FIGURE 4 is a partial full section view through the thrust bearing housing of a stop countersink built in accord with the present invention and indicates a modified form of thrust bearing using a Teflon wafer to minimize cost, weight, and assembly.

In general the stop tool of the present invention comprises a tubular spindle housing and an outer coaxial tubular sleeve or foot threadably engageable over the spindle housing. A spindle is provided axially through the housing and having a constant stroke. External serrations are provided on the housing and a spring ring circumferentially around the foot member extends through the sleeve or foot into resilient detenting engagement with the serrations, thereby allowing adjustment of the axial elongate relationship between housing and sleeve and consequent calibrated adjustment of final tool travel.

Referring to the drawing, and particularly to FIGURE 1 the stark simplicity of the stop tool 11 (shown assembled in FIGURE 2) is best appreciated when the foot or skirt member 12 is understood in reference to the base housing 13. The foot or skirt member is tubular and contains internal threads 14 (FIGURE 2) which matingly and operably engage the external threads 15 annularly positioned on the housing 13. The foot or skirt 12 is thus seen to be threadable axially over the housing 13. The housing 13 is also tubular and to the extent of thread engagement with the foot or skirt member 12, telescopes inside of the foot member 12. The housing 13 carries external coining or serrations 16 in the form of elongate splines which are radially disposed about the lower barrel portion 17 of the housing 13. A flanged spindle 18 is insertable in the housing 13, the flange 19 restraining the spindle 18 from falling through the axial opening 20 in the housing 13. Thus, the housing 13 provides a radial bearing function in relationship to the spindle 18. This bearing is augmented by the sleeve bearing 21 press fitted into the bore 20 of the housing 13. The sleeve bearing 21 engages the raised bearing surface 22 on the spindle 18 when assembled. Opposite the serrated lower barrel portion 17 of the housing 13 and integral therewith is the head portion 23 having an internal bore 24 (FIGURE 2) coaxial with the bore 20 and of increased diameter thereby forming a thrust shoulder 25 (FIGURE 2). The bore 24 is thus prepared to receive the thrust bearing assembly 26 which comprises a lower annular race 27 an upper annular race 28 and an annular ball cage 29 carrying a plurality of balls 30. As will be appreciated the lower race 27 engages the shoulder or step 25 in the housing 13 thereby transmitting thrust in the bearing 26 to the housing 13. A compression spring 31 of such size as to telescope over the shank portion 32 of the spindle 18 is provided. A spring retaining cap member 33 is also provided having a running fit over the shank 32 of the spindle 18 and a running fit in relation to the bore 24 of the housing 13. The shank 32 of the spindle 18 is provided with an annular groove 34. The retaining ring 35, upon assembly, is lockably sprung into the groove 34 of the spindle 18 in such manner as to place the spring 31 in compression as between cap 33 and upper race 28 and the spring 31 thereby resiliently urges the spindle 18 into normal shouldering relation with the housing 13. The skirt or foot element 12 comprises a stock engaging head portion 36 having visibility openings 37 and 38. An annular groove 39 is provided externally about the foot element 12. An opening 40 is provided in the groove 39 extending transversely through the wall of the foot member 12. The groove 39 thus accommodates an annular ring spring member 41 having a segment thereof removed therefrom and a radial inwardly extending rounded dog 42 on one end of the ring segment 41. The dog 42 is dimensioned to extend through the opening 40 in the foot or skirt member 12 and normally engage itself in one of the serrations 16 of the housing 13. An index mark 43 is provided on the upper peripheral edge of the foot element 12, which on assembly is related to the annular band of micrometer markings 44 provided on the upper end 23 of the housing 13. As will be appreciated, the selection of the thread between housing 13 and foot element 12 determines the relative axial movement as between foot element 12 and housing 13 in a given full rotation. The selection, then of the number of serrations 16 about the barrel 17 calibrates the fractional movement short of a full rotation per interval of turn. For example, if each full turn moved the sleeve 12 a distance of .025 inch and 25 serrations were provided, one serration of rotational movement would move the sleeve 12 a distance of .001 inch. Thus, each calibration mark, being equal to the number of serrations would indicate a movement of .001 inch between the foot element 12 and the housing 13. Obviously other thread series may be selected for coordination with a given number of serrations but the above description illustrates the selection. The relationship between the external spring ring 41 and any single serration 16 is a detent relationship which overcomes dislodgment during use of the tool.

Referring to FIGURE 2, the assembled relationship as between the parts exploded in FIGURE 1 is shown in fully retracted relationship with the sleeve of foot member 12 fully threaded upon the housing 13 and with the ring spring 41 in the groove 39 and with the dog 42 detenting in one of the serrations 16. Rotation of the sleeve foot 12 results in movement as between members 12 and 13 with attendant resilient movement of the ring spring member 41 as the dog end 42 rides from serration to serration. Each serration of movement gives as an audible click as well as a motion that may be felt stepwise, by the operator. This may be checked against the calibrations on the micrometer scale. The spindle 18 retains its position as shown with the flange 19 bearing upon the housing 13. The spindle 18 has its surface 22 in rotational and reciprocal bearing engagement with the sleeve bearing 21 secured in the bore 20 of housing 13. The anti-friction thrust bearing 26 is spring secured against the internal shoulder 25 in the housing 13 and the single spring 31 also urges the spindle 18 into the position as shown. The shank 32 protrudes from the cap 33 and is retained in that position by the retaining ring 35. Thus, it will be seen that to the extent of the distance gap as between cap 33 and thrust bearing 26 the amount of reciprocation of the spindle 18 is always constant. Thus, the countersink or tool 45 axially inserted in the socket 46 of the spindle 18 is constant in its axial movement or travel, but the relative position of foot 12 and housing 13 is variable. The countersink tool 45 is illustrative only of a variety of tools, variant in length and size which may be used in the stop device herein described. Precision adjustment is therefore made by altering the relative position of the sleeve foot 12 on the thread 15 of the housing 13.

The shank 32 is suitably chucked in drill press or hand tool as required and not shown.

FIGURE 3 is a section view taken transverse of the stop countersink axis through the spring ring 41, the lower portion 17 of the housing 13 with serrations 16 and indicates the engagement of the rounded head 42 of the ring 41 through the sleeve foot element 12 in resilient engagement so that adjustment is by click or feel.

FIGURE 4 illustrates a modified form of structure wherein the thrust bearing 26' comprises an annular Teflon (a high polymer of tetrafluoroethylene or poly tetrafluoroethylene) wafer 47 sandwiched between a pair of annular metal rings 48 and 49. In other regards the thrust bearing 26' is mounted similar to the bearing 26, the lower metal ring 49 bearing on a shoulder 25' in the housing 13'. The spring 31' urges resilient separation between cap 33' and bearing 26' and the cap 33' is retained against the spring by the retaining ring 35' in the groove 34' of spindle 18'. As in the structure of FIGURE 2 the stroke of the spindle 18' is determined by the distance between the cap 33' and engagement with the thrust bearing 26'.

As will be appreciated, a complete revision of structure as to simplicity has resulted from the use of an external click adjustment arrangement operable through the tubular foot or skirt member in resilient engagement with longitudinal serrations provided on the housing parallel to the spindle axis. The Teflon bearing replacing prior antifriction devices has proved quite simple to install and maintain. The thrust bearing 26' substantially extends the bearing life and materially reduces weight and bulk. In operation the stop countersink performs a precision job and no wear occurring as between serrations and spring ring has an opportunity to foul the mechanism or bearings. The device is substantially proof against chip fouling and the bearing arrangement relieves the tool to which the device is chucked from operating strain resulting from thrust or radial loading. In the field the devices have been received enthusiastically by reason of the extreme structural simplification, low cost, and simple maintenance.

While an operative embodiment of the stop countersink structure has been described and illustrated other modifications within the skill of the art will be readily appreciated. Such modifications are intended to be included herein limited only by the scope of the hereinafter appended claims.

We claim:

1. A depth stop control including: a cylindrical bearing housing having an external serrated spline-like lower portion and an adjacent threaded portion; a tubular sleeve-like foot member over said housing and threadably engageable thereover; resilient means around said foot member and extending through said foot member to resiliently engage said serrations in step-wise click relation upon relative rotation between said foot member and said housing.

2. A stop tool comprising: a tubular spindle housing; a tubular foot member threadably over said housing; an axial externally splined extension from said housing; a spring ring member having a segment removed therefrom and having a head portion extending through said foot member and resiliently engageable with said splined extension; a radial bearing in said housing; a thrust bearing in said housing and including an antifriction element disposed between two annular wafers; a spindle through said housing journalled in said bearings and axially movable in said bearings through a constant stroke.

3. A stop tool comprising: a spindle housing; a tubular foot member threadably over said housing; an axial externally splined extension from said housing; a spring member around said foot and having a head portion extending through said foot member and resiliently engageable with said splined extension; a radial bearing in said housing; a thrust bearing in said housing and including three annular members, an upper metal annulus, a lower metal annulus and a tetrafluoroethylen polymer intermediate annular wafer; and a spindle axially through said housing and journalled in said bearings.

4. A stop countersink structure including: a flanged spindle adapted to receive a tool; a radial thrust bearing on said spindle while allowing reciprocation of said spindle; a thrust bearing around said spindle; a bearing housing containing said bearings and said spindle; a compression spring shouldering said thrust bearing against said housing; a cap member over said spindle and bearing against said spring; a retaining element fixed to said spindle and securing said cap against said spring in normal spaced apart relationship from said thrust bearing; a spline section coaxially extending from said housing and stop engaging said flanged spindle; a tubular foot member having internal threads and threadably engageable over said housing; and a resilient ring member over said tubular foot member, having an end extending through said tubular member to engage said serrations in audible stepwise manner as said tubular member is rotated in respect to said housing.

5. In a stop countersink structure, the combination comprising: a tubular sleeve having a groove therein and a transverse opening through said sleeve in said groove and said sleeve being internally threaded; a cylindrical spindle housing telscoping axially into said tubular sleeve having an external threaded portion engageable with the threads in said sleeve and having a splined adjacent section; and a ring spring having a segment removed positioned in the groove of said sleeve and having a rounded head extending through the opening through said groove in said sleeve and resiliently engaging said splined section of said housing thereby providing a click adjustment when said sleeve is rotated threadably in relation to said housing.

6. An adjustable stop countersink comprising: a cylindrical base housing having an externally provided male thread and a splined lower end portion and defining an axial opening therethrough; a flange ended shaft member through said housing; a cylindrical shoe having female threads therein matingly engageable with the male threads on said housing; a ring retaining groove about said shoe and having an opening therethrough; a retaining ring spring segment in said groove, one upset end thereof extending radially and inwardly through said opening through said shoe in said groove and resiliently engageable with said splined portion of said housing; a bearing in said housing bearing on said shaft; stop means secured to said shaft which with the flange on said shaft establishes a fixed axial stroke for said shaft.

References Cited in the file of this patent
UNITED STATES PATENTS 2,359,859    Jarvis _____ Oct. 10, 1944